(12) United States Patent
Gupta

(10) Patent No.: US 11,107,065 B1
(45) Date of Patent: Aug. 31, 2021

(54) CONTEMPORANEOUS PAYMENT TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/889,916

(22) Filed: Jun. 2, 2020

(51) Int. Cl.
  *G06Q 20/34* (2012.01)
  *G06K 19/077* (2006.01)
  *G06K 19/07* (2006.01)

(52) U.S. Cl.
  CPC ....... *G06Q 20/352* (2013.01); *G06K 19/0724* (2013.01); *G06K 19/07707* (2013.01); *G06K 19/07711* (2013.01); *G06Q 20/3415* (2013.01)

(58) Field of Classification Search
  CPC ................ G06Q 20/352; G06Q 20/40145
  USPC ................................. 235/380, 492
  See application file for complete search history.

(56) References Cited

U.S. PATENT DOCUMENTS

| | | |
|---|---|---|
| 8,955,744 B2 | 2/2015 | Granucci et al. |
| 2015/0262052 A1* | 9/2015 | Pahuja ............. G06Q 20/40145 340/10.52 |
| 2016/0260087 A1* | 9/2016 | Lee ....................... H04L 63/102 |
| 2016/0267486 A1* | 9/2016 | Mitra .................. H04W 12/041 |
| 2016/0300224 A1* | 10/2016 | Liu ..................... G06Q 20/3829 |
| 2019/0286805 A1* | 9/2019 | Law ......................... G06F 21/34 |

* cited by examiner

*Primary Examiner* — Allyson N Trail
(74) *Attorney, Agent, or Firm* — Weiss & Arons LLP; Michael A. Springs, Esq.

(57) ABSTRACT

Typically, online payments require entering sensitive transaction information into a third-party web browser or application. This may expose sensitive transaction information to an increased risk of inadvertent disclosure. Apparatus and methods are provided for a smart card which enables users to securely complete online payments without entering any sensitive transaction information into a third-party system. The smart card may include a touch-sensitive screen configured to display selectable payment options. The smart card may include a microprocessor and wireless interface. The wireless interface may provide wireless communication capabilities and the ability to initiate online payments based on information captured by the touch-sensitive screen.

15 Claims, 6 Drawing Sheets

CONTEMPORANEOUS PAYMENT TECHNOLOGY

FIELD OF TECHNOLOGY

Aspects of the disclosure relate to a smart payment card with enhanced communication features.

BACKGROUND OF THE DISCLOSURE

When conducting online transactions and payments, users typically enter credit card information or other sensitive transaction information into a web browser or mobile application. However, doing so increases a risk that the sensitive transaction information will be exposed. For example, security associated with the web browser may be substandard or the security of another network system utilized by a mobile application may be compromised. These potential security flaws associated with third-party systems that transmit and capture sensitive transaction information may increase the exposure risk.

In addition to security breaches of even reputable third-party systems, there are unscrupulous actors who design systems which attempt to induce users to enter sensitive transaction information into legitimate-looking webpages. These rogue systems are typically designed to masquerade as a reputable system or webpage, and thereby induce the user to enter sensitive transaction information. The system may then expose the captured sensitive transaction information for self-serving pecuniary gain.

Recently, use of digital wallets has proliferated. These digital wallets are typically associated with more reliable security than prior systems. However, even use of a digital wallet does not fully address the challenges in securing sensitive transaction information. For example, when using digital wallets, sensitive transaction information may still be captured using third-party applications that may track use and content of the sensitive transaction information. By increasing the number of parties that handle the sensitive transaction information, there is an associated increase in risk that the sensitive transaction information will be inadvertently disclosed.

It would be desirable to provide more secure apparatus and methods for users to make online payments or other transactions without providing sensitive transaction information to any third-party system. In addition to reducing the exposure risk of sensitive transaction information, such apparatus and methods may improve the user experience when making an online payment.

It would further be desirable to enable multiple contemporaneous online payments directly from a smart card.

SUMMARY OF THE DISCLOSURE

A smart card may enable direct online payments and improve the security of sensitive transaction information. The smart card may include a housing. A wireless communication interface, a microprocessor, and a battery for powering the communication interface and the microprocessor may be embedded in the housing. The smart card may include a touch-sensitive screen that captures finger motions.

The smart card may include executable instructions stored in a non-transitory memory. The executable instructions, when run by the microprocessor may display a selectable payment option using the touch-sensitive screen. The executable instructions may capture a touch-based selection of the payment option using the touch-sensitive screen, and based on the captured selection, formulate a set of payment instructions.

The executable instructions may, using the wireless interface, establish a direct communication channel with a secure payment gateway identified in the payment instructions and transmit the payment instructions directly to the secure payment gateway for processing.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
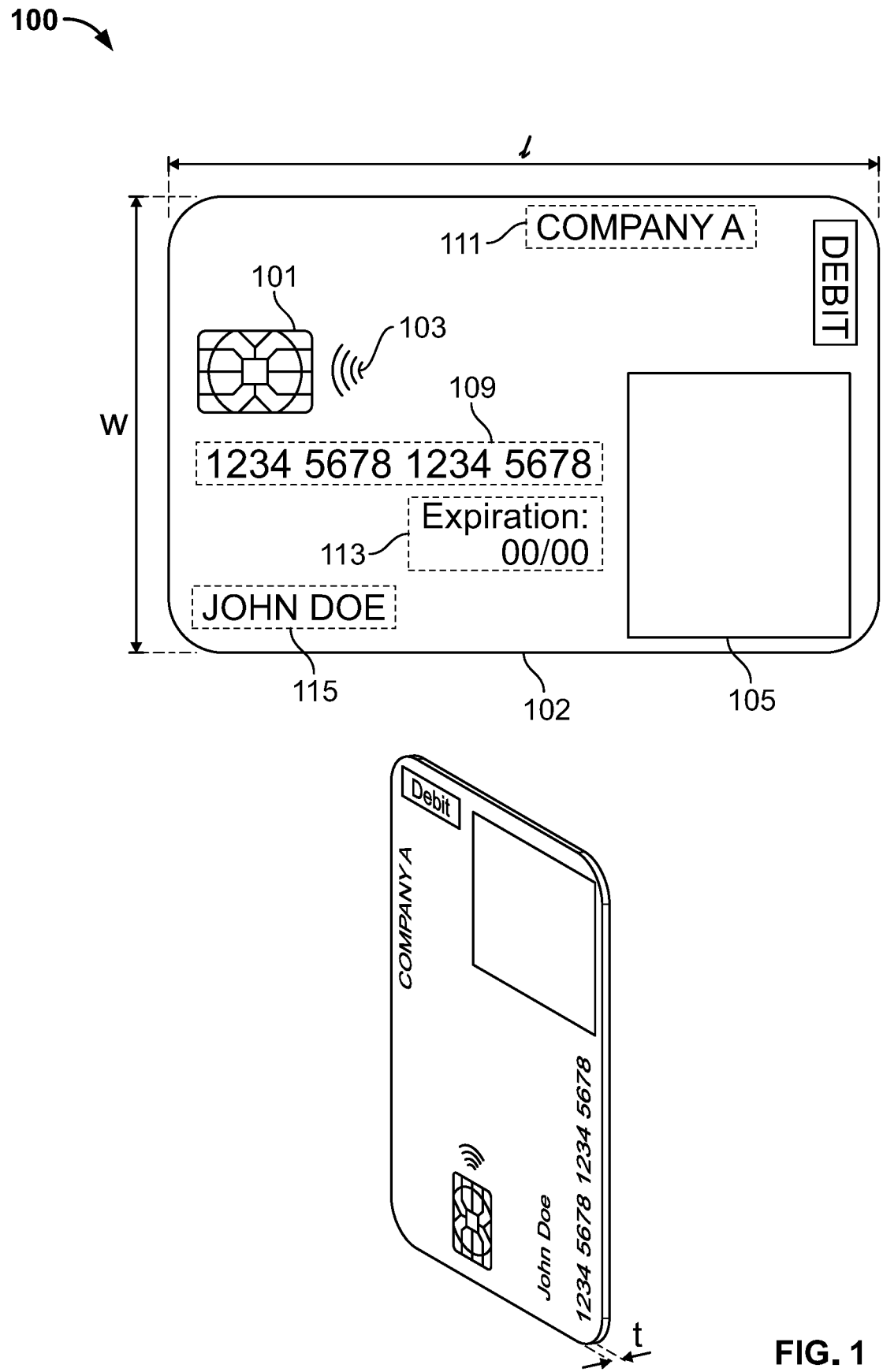
FIG. 1 shows illustrative apparatus in accordance with principles of the disclosure.

Apparatus for a system that improves transmission security of sensitive transaction information for online payments is provided. The system may include a smart card. A smart card may be a payment (e.g., debit or credit) card that includes embedded integrated circuitry. The integrated circuitry may be configured to store sensitive transaction information. The integrated circuitry may also be configured to execute machine readable instructions that control operation of other components of the smart card.

The smart card may include hardware and associated integrated circuitry for users to complete online payments without entering sensitive transaction information into a third-party system such as a web browser or other software applications. The smart card may include a touch-sensitive screen. The smart card may include a virtual or mechanical keypad. The user may use the touch-sensitive screen or depress keys on the mechanical keypad to enter information directly into the smart card.

The smart card may include a microprocessor and a Network Interface Card ("NIC"). The microprocessor and associated NIC may enable the smart card to establish a communication channel. Over the secure communication channel, the smart card may interact directly with a secure system for making a payment. The secure system may be operated by an issuer of the smart card or an acquirer of the merchant. The microprocessor may have a thickness that is not greater than 0.25 millimeters ("mm"). The microprocessor may control overall operation of the smart card and its associated components.

The smart card may include various other hardware components. Such components may include a battery, a speaker, and antenna(s). The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the smart card to perform various functions. For example, software may include an operating system, application programs, web browser and a database. Alternatively, some or all of computer executable instructions of the smart card may be embodied in hardware or firmware components of the smart card.

Application programs, which may be used by the smart card, may include computer-executable instructions for invoking user functionality related to communication, authentication services, and voice input and speech recognition applications. Application programs may utilize one or more algorithms that encrypt information, process received executable instructions, interact with an issuer or acquirer bank systems, perform power management routines or other suitable tasks.

The smart card may include a pressure sensitive button. The pressure sensitive button may have a thickness that is not greater than 0.8 mm. A user may actuate the pressure sensitive button to power on or off one or more components of the smart card. For example, actuating the pressure sensitive button may activate the microprocessor, NIC, touch-sensitive screen, or keypad of the smart card.

The smart card may operate in a networked environment. The smart card may support establishing communication channels with one or more issuer or acquirer bank systems. The smart card may connect to a local area network ("LAN"), a wide area network ("WAN") a cellular network or any suitable communication network. When used in a LAN networking environment, the smart card may be connected to the LAN through a network interface or adapter. The NIC may include the network interface or adapter.

When used in a WAN networking environment, the smart card may include a modem or other means for establishing communications over a WAN, such as the Internet. The NIC may include the modem. It will be appreciated that the existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic hardware components of the smart card. For example, the battery may supply power to a keypad, touch-sensitive screen, NIC and microprocessor. The battery may have a thickness that is not greater than 0.5 mm.

The battery may be rechargeable. The battery may be recharged via any suitable method. Illustrative charging methods include solar charging, wireless inductive charging, and connection via a charging port.

In some embodiments, the smart card may include an electrical contact. The battery may be recharged via an electrical contact when the smart card is inserted into an Automated Teller Machine ("ATM"). An electrical contact may be constructed using any suitable material that conducts or transfers electricity. The smart card may include a plurality of electrical contacts. An electrical contact may be accessible on any suitable face of a housing of the smart card. The contact may be utilized to transfer electrical charge to the rechargeable battery when the smart card is inserted into a card reader of the ATM.

In some embodiments, the smart card's power source may include high frequency signals received from an ATM or other network node. The smart card may be configured to utilize received high frequency signals to recharge the battery or provide power to other hardware components of the smart card. The high frequency signals may conform to a standardized near field communication (NFC) communication standard.

Illustrative NFC protocols include European Computer Manufacturers Association Document Nos. 340 and 352 and International Organization for Standardization Document Nos. 18092 and 21481. All these standards are hereby incorporated by reference herein in their entireties.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in and protected by the housing. The smart card may include a wireless interface embedded in the housing. The wireless interface may include a NIC. The smart card may include a touch-sensitive screen on an outside surface of the housing. The smart card may include a keypad mounted on an outside surface of the housing.

The housing and the keypad collectively may have a thickness that is not greater than 0.8 millimeters ("mm") and a surface area that is not greater than 86 mm×54 mm. Such a compact form factor may allow the smart card to be inserted into traditional card readers and function as a typical debit or credit card.

For example, the user may use the smart card to access an ATM and withdraw cash. The user may also use the smart card to make a purchase at a traditional brick and mortar merchant location. The user may pay for such a purchase using a conventional point-of-sale ("POS") terminal at the brick and mortar location. When the smart card is inserted into card reader of an ATM or POS terminal a battery of the smart card may be recharged.

The smart card may include a touch-sensitive screen. The touch-sensitive screen may capture finger motions. The finger motions may include payment information entered by a user of the smart card. The microprocessor may capture the finger motions entered using the touch-sensitive screen.

The smart card may include specialized software (executable by the microprocessor) for automatic conversion of finger motions as they are input by the user on the touch-sensitive screen.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to detect a touch point. Resistive-touch technology is also relatively less expensive than other touch sensing technologies.

The touch-sensitive screen may utilize capacitive touch technology to detect user touch points. Screens constructed using capacitive touch technology may identify where a user touches based on detecting an electrical disturbance created when the user touches the screen. The human body is an electronical conductor and, contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging, infrared acrylic projection or acoustic pulse recognition technologies.

The smart card may include a touch-sensing controller for detecting a touched location. The touch-sensing controller may include an application-specific integrated circuit (ASIC) chip and a digital signal processor (DSP) chip.

In some embodiments, the touch-sensitive screen may provide "single-touch" functionality. In some embodiments, the touch-sensitive screen may provide "multi-touch" functionality. Single-touch functionality may detect input from one user touch on the touch-sensitive screen. For example, the touch-sensitive screen may display a list of payment options and the user may select one or the option by using a finger to touch the desired option. Single-touch functionality may also recognize double finger taps or a long-press functionality. Multi-touch functionality may detect input from two or more simultaneous user touch points on the touch-sensitive screen. For example, a pinch-to-zoom feature is a multi-touch functionality.

The touch-sensitive screen may include nano-thin light emitting diode ("LED") technology.

The touch-sensitive screen may include organic light emitting diode ("OLED") technology. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The touch-sensitive screen may have a thickness that is not greater than 0.25 mm. The touch-sensitive screen may be flexible. The touch-sensitive screen may cover any suitable portion of a card surface. The touch-sensitive screen may cover an entire card surface.

The smart card may include a haptic response system. The haptic response system may provide a responsive force, vibration or movement in response to receiving a user's touch input. For example, the haptic response system may provide a responsive vibration to a user's touch-based selection of a payment option. The haptic response system may include an eccentric (unbalanced) rotating mass, a linear resonant actuator, a piezoelectric actuator or any other suitable hardware for providing a haptic response.

The microprocessor and associated hardware may interpret finger motions of the user applied to the touch-sensitive screen. For example, the microprocessor may translate the user's finger motions into digital payment information. The microprocessor may translate the user's finger motions into digital payment instructions. The microprocessor may encrypt the captured finger motions.

The microprocessor may formulate a set of payment instructions based on the captured finger motions. The microprocessor may formulate a set of payment instructions based on a user's touch-based selection of a payment option displayed on the touch-sensitive screen. The user may provide touch-based confirmation of the accuracy of a payment instruction formulated by the microprocessor.

Illustrative finger motions entered using the touch-sensitive screen and encrypted by the microprocessor may include a personal identification number ("PIN") associated with the smart card, selection of a payment recipient, and entry of a payment percentage or amount.

The touch-sensitive screen may have an inactive state. In the inactive state, the touch-sensitive screen may be unable to capture data such as a user's touch inputs. When the touch-sensitive screen is in the inactive state, touch inputs including finger motions applied to the touch-sensitive screen may not be captured by the microprocessor.

The touch-sensitive screen may have an active state. In the active state, the touch-sensitive screen may be capable of capturing data, such as a user's touch inputs. The inactive state may be a default state of the touch-sensitive screen. A default inactive state may avoid the microprocessor capturing inadvertent touch inputs.

The microprocessor may toggle the touch-sensitive screen from the inactive state to the active state. The microprocessor may toggle the touch-sensitive screen from the active state to the inactive state.

The smart card may include a touch-sensitive screen and a keypad. The keypad may be a mechanical keypad. In such embodiments, the housing and the keypad collectively may have a thickness that is not greater than 0.8 mm.

In some embodiments, the smart card may only include a touch-sensitive screen. The touch-sensitive screen may be configured to display a virtual keypad. The virtual keypad may include a display of input buttons that may be touch-selected by the user. In such embodiments, the housing and the touch-sensitive screen collectively may have a thickness that is not greater than 0.8 mm.

The smart card may include executable instructions stored in a non-transitory memory. The executable instructions, when run by the microprocessor may receive an input from a user. For example, the input may include a user's touch-based selection of a payment option displayed on a touch-sensitive screen. The input may include a payment amount or percentage of a payment amount entered into a virtual or mechanical keypad. The executable instructions may formulate a set of sensitive payment instructions based on the input.

The formulated sensitive payment instructions may incorporate sensitive transaction information stored on the smart card. Sensitive transaction information, as used herein, may include:

Primary Account Number ("PAN")
User name
Address
Telephone number
Expiration date
Service code
Authentication data
Personal Identification Number ("PIN")
PIN Block
Card validation value (CVV), or any other three/four-digit card security code The PAN is a typically multi-digit number printed on a front face of the smart card. The PAN may identify an issuer bank associated with the smart card. The smart card may correlate the specified issuer to the network address of a secure payment gateway. The PAN may identify a user account at the issuer bank.

A PIN associated with the smart card may be a secret numeric password known only to the user of the smart card. The PIN may be used to authenticate the user before providing access to a secure payment processing system. A user may only be granted access to the secure system if the PIN provided matches a PIN stored on the secure system. For example, a PIN may be used to authenticate the smart card at an ATM. A PIN may also be used to authorize a digital signature implemented by an EMV chip.

A PIN Block includes data used to encapsulate a PIN during processing and transmission of the PIN. The PIN block defines the location of the PIN within the PIN block and how it can be extracted from the PIN block. A typical PIN block includes the PIN, the PIN length, and may contain subset of the PAN.

A service code may be a multidigit number. For example, in a three-digit service code, the first digit may indicate specific interchange rules that apply to the smart card. The second digit may specify authorization processing that is applied to the smart card when initiating a transaction. Illustrative authorization processing may include requiring submission of a PIN, biometric feature, signature or a combination thereof. The second digit may also identify a secure payment gateway that is authorized to process payment instructions formulated by the smart card.

The third digit may specify a range of services that are authorized in connection with use of the smart card. For example, the third digit may indicate whether the smart card may be used at an ATM to withdraw cash or only to purchase goods or services from a merchant.

The smart card may receive a communication from a merchant or a card issuer regarding a payment due. In some embodiments, the smart card may be automatically registered to receive communications in response to a previous payment to the same merchant using the smart card. In some embodiments, the user may register the smart card with an issuer bank or with a merchant. The communication may be pushed to the smart card.

The smart card may display any part of the communication on the touch-sensitive screen. The smart card may display one or more selectable payment options associated with the payment due on the touch-sensitive screen. For example, the smart card may display an option to pay a bill, confirm a payment amount or edit a payment amount. The selectable options may include text, icons or any suitable graphical representations. The smart card may prompt entry of a PIN or other suitable authorization before displaying the communication or the selectable payment options.

In some embodiments, selection of a payment option may involve display of a virtual keyboard on the touch-sensitive screen. For example, selection of an option to edit a payment amount may involve displaying a virtual keyboard on the touch-sensitive screen for the user to enter an edited payment amount.

In some embodiments, a selectable payment option may include a predetermined name or abbreviation associated with the payment due. For example, the selectable payment option may include a merchant name or service category. In some embodiments, merchants or other payment recipients and service categories may be customized by the user. The customizing may be executed using the smart card touch-sensitive screen, virtual keypad or mechanical keypad. The customizing may be executed using a smartphone application associated with the smart card. The customizing may be executed using a banking channel portal.

The smart card may capture a user's touch-based selection of a payment option displayed on the touch-sensitive screen. In some embodiments, the smart card may capture a code entered into a virtual or mechanical keyboard. The code may be transmitted to a user by a merchant or a card issuer via any suitable communication channel. The code may be provided in a bill generated by a merchant or card issuer.

The smart card may identify a merchant and an amount of a payment based on the captured input. The smart card may formulate payment instructions based on the input. The smart card may encrypt the payment instructions. Only the secure payment gateway may be capable of decrypting the payment instructions.

Using a wireless interface, the smart card may establish a direct communication channel with a secure payment gateway. A network address of the secure payment gateway may be identified in the payment instructions formulated by the microprocessor. The location of the secure payment gateway may be determined based on identity of the merchant.

The smart card may execute multiple contemporaneous payments. The smart card may receive a communication regarding multiple payments due. The smart card may display selectable options associated with each payment due on the touch-sensitive screen. For example, the smart card may display an option to "pay credit card bill" and an option to "pay electric bill." The smart card may enable a touch-based input selecting multiple payment options.

A multiple payment handler embedded in the smart card may identify the multiple payments associated with the selected options. The multiple payment handler may be a program module. The multiple payment handler may enable the smart card to securely execute concurrent payments to the same merchant. The multiple payment handler may enable the smart card to securely execute concurrent payments to different merchants.

The multiple payment handler may communicate with a payment interface on the smart card. The payment interface may resolve different merchant identities to different secure payment gateways. The payment interface may resolve a first payment to a first secure payment gateway. The wireless interface may communicate with the first secure payment gateway using a first communication protocol. Communication with the first secure payment gateway may be encrypted using a first encryption algorithm. The payment interface may resolve a second payment to a second secure payment gateway. The wireless interface may communicate with the second secure payment gateway using a second communication protocol. Communication with the second secure payment gateway may be encrypted using a second encryption algorithm.

The smart card may transmit payment instructions that include sensitive transaction information directly to the secure payment gateway for processing. In some embodiments, the smart card may transmit the sensitive transaction information to the payment gateway in a separate communication, distinct from transmission of payment instructions. In some embodiments, the smart card may transmit the sensitive transaction information to a first payment gateway and transmit the payment instructions to a second payment gateway. A secure payment gateway may process the payment instructions thereby reducing an exposure risk of the sensitive transaction information.

The secure payment gateway may be operated by an issuer or an acquirer bank. The secure payment gateway may process a payment on behalf of a merchant. The secure payment gateway may credit an account of the merchant for the payment by the user of the smart card. The secure payment gateway may debit an account of the user of the smart card for the payment.

The smart card may receive confirmation from the secure payment gateway that the payment instructions have been successfully executed. For example, the secure payment gateway may communicate to the smart card via the wireless interface that the payment instructions generated by the smart card have been successfully executed.

The secure payment gateway may provide the smart card with confirmation that a payment is completed. The confirmation may be displayed on the touch-sensitive screen. In some embodiments, the user may be provided the option to enter additional information using touch-based selection of an option on a touch-sensitive screen, a virtual keypad or a mechanical keypad. The secure payment gateway may trigger the smart card to prompt for the additional information.

In some embodiments, the smart card may receive confirmation directly from a merchant computer system. After successfully processing the payment instructions, the secure payment gateway may push a notification to the merchant system confirming successful execution of the payment instructions.

The smart card may include a biometric reader. The microprocessor may require submission of a valid biometric feature before attempting to establish a communication channel with the secure payment gateway. The microprocessor may require submission of a valid biometric feature before submitting the payment instructions to the secure payment gateway.

In some embodiments, the microprocessor may require a touch-based confirmation from the user before transmitting payment instructions to the secure payment gateway. The touch-based confirmation may include the screen displaying a confirmatory message and requiring the user to register confirmation by touching a target area of the screen.

In some embodiments, the smart card may include a fingerprint reader embedded within, or underneath the touch-sensitive screen. The user may register confirmation of payment instructions by providing a fingerprint using the embedded fingerprint reader. The microprocessor may confirm whether the provided fingerprint matches a known fingerprint securely stored locally on the smart card. The microprocessor may display the target area associated with a confirmatory message overlaid above the embedded fingerprint reader. By pressing a finger against the target area, the user may register confirmation by touching a target area of the screen and simultaneously submit a fingerprint for verification.

A wireless interface of the smart card may include an inactive state. When in the inactive state, the wireless interface may be unable to connect to a communication channel or transmit data. The wireless interface may include an active state. In the active state, the wireless interface may be capable of connecting to a communication channel, receiving data or transmitting data. The microprocessor may toggle the wireless interface from the inactive state to the active state. The microprocessor may toggle the wireless interface from the active state to the inactive state.

For example, the microprocessor may detect that a valid PIN has been entered by the user of the smart card using the virtual keypad. In response to receiving the valid PIN, the microprocessor may toggle the wireless interface from the inactive to the active state. In response to receiving an invalid PIN, the microprocessor may maintain the wireless interface in the inactive state. In some embodiments, if the microprocessor detects a threshold number of invalid PIN entries, the microprocessor may lock the wireless interface.

The microprocessor may require a special code to unlock the wireless interface. The microprocessor may require that the smart card establish a wired connection to unlock the wireless interface. For example, the wireless interface may only be unlocked when the smart card is inserted into a card reader of an ATM. The smart card may also require entry of a valid PIN to access the ATM before unlocking the wireless interface.

The smart card may include a voice controller. The voice controller may generate an audio message confirming the microprocessors interpretation of the user's touch inputs applied to the touch-sensitive screen and captured by the input controller. The microprocessor may prompt the user to touch a target area of the screen to confirm an accuracy of the generated audio message. In response to receiving the user's confirmation, the microprocessor may generate payment instructions for executing the payment identified in the audio message.

The smart card may include a voice controller. The voice controller may generate an audio message confirming a substance of the encrypted payment instructions generated by the smart card. For example, the voice controller may generate an audible message that identifies a payment amount.

The voice controller may generate this audible message before payment instructions and any associated sensitive payment information are transmitted to the secure payment gateway. After the voice controller generates the audible message, the microprocessor may not transmit the encrypted payment instructions to the payment gateway until receiving authorization entered using the touch-sensitive screen or keypad. The authorization may be entered by pressing target keys on a virtual or mechanical keypad, or by selecting a selectable option on the touch-sensitive screen to confirm that the user of the smart card wishes to proceed with the transaction.

In some embodiments, the microprocessor may prompt the user to touch a target area of the screen to confirm an accuracy of the generated audio message. In response to receiving the user's confirmation, the microprocessor may generate payment instructions for executing the payment identified in the audio message. In some embodiments, the audio message may itself specify one or more target authorization keystrokes. Illustrative target authorization keystrokes may include pressing two or more keys concurrently or a specified sequence of keys.

A system for enabling direct online payments while improving the security of sensitive transaction information is provided. The system may include a smart card having a thickness not greater than 0.8 mm and a surface area not greater than 86 mm×54 mm. The smart card may include hardware components such as a communication interface and a microprocessor. The smart card may include a user input system in electronic communication with the microprocessor. The user input system may include a touch-sensitive screen and an input controller. The input controller may capture touch inputs entered using the touch-sensitive screen.

The smart card may include a touch-sensitive screen. The touch-sensitive screen may display a virtual keypad. The touch-sensitive screen may not expand the form factor of the smart card beyond 86 mm×54 mm×0.8 mm.

In some embodiments, the smart card may include a mechanical keypad. The keypad may not expand the form factor of the smart card beyond 86 mm×54 mm×0.8 mm.

The smart card may include a wireless communication interface. The wireless communication interface may be configured to communicate using any suitable wireless communication protocol. Exemplary wireless communication protocols may include Wi-Fi, ZigBee, cellular and NFC.

The smart card may include a microprocessor. The microprocessor may be configured to control overall operation of the smart card and its associated components. The smart card may include executable instructions stored in a non-transitory memory. The executable instructions, when run by the microprocessor, may configure the microprocessor to take actions or control operation of one or more components of the smart card.

The executable instructions, when run by the microprocessor may formulate payment instructions. The microprocessor may encrypt the payment instructions. The microprocessor may formulate payment instructions based on user input via the touch-sensitive screen or mechanical keypad.

The microprocessor may activate a wireless interface of the smart card. The wireless interface may include a NIC. Using the wireless interface, the microprocessor may establish a communication link with a secure payment gateway. A network address of the payment gateway may be stored on the smart card. For example, the network address of a secure payment gateway may be stored in firmware of the smart card's NIC.

In other embodiments, the smart card may include a payment interface. The payment interface may determine a network address of a secure payment gateway based on a communication regarding a payment due. The payment interface may determine a network address of a secure payment gateway based on a user input via the touch-sensitive screen or mechanical keypad. The payment interface may resolve different inputs to different payment gateways.

The payment interface may determine an appropriate payment gateway based on the identity of a merchant. For example, different merchants may be associated with different acquirer banks. Each of the acquirer banks may utilize different security or communication protocols. The payment interface may direct the smart card to a payment gateway that is compatible with the security or communication protocols utilized by a particular acquirer bank.

The payment interface may determine an appropriate payment interface based on the amount of a payment. For example, a payment gateway that requires higher level security and authentication may be utilized for larger payments.

The executable instructions, when run by the microprocessor, may authenticate the smart card to the payment gateway over the secure communication channel. The microprocessor may transmit the encrypted payment instructions to the payment gateway. The payment gateway may then process the payment instructions received from the smart card.

Processing the payment instructions may include debiting an account of the smart card user an amount corresponding to the payment amount. After debiting a user account, the payment gateway may provide confirmation to the smart card and to the merchant.

By interacting with the payment gateway, the system insulates sensitive information from being exposed to potentially unsecure third-party systems. The user input may succinctly identify information needed to process a payment. The user input may be securely entered directly into the smart card. The smart card then securely communicates with a secure payment gateway to process the payment based on the information provided in the user input.

Methods for securing sensitive transaction information stored on a smart card are provided. Methods may include completing an online payment without transmitting sensitive transaction information directly to a merchant selling a product or any other third-party computer system. A third-party system may be defined as any system that is not operated by an issuer of the smart card. Methods may include, using a touch-screen of the smart card, selecting a payment option displayed on the touch-sensitive screen. Methods may include, using a virtual or mechanical keypad of the smart card, entering a code generated by a merchant or card issuer.

Methods may include generating payment instructions. The payment instructions may integrate sensitive transaction information stored locally on the smart card. Methods may include determining a network address of a secure payment gateway. Using a wireless interface of the smart card, methods may include establishing a secure communication channel with the secure payment gateway.

Methods may include transferring the payment instructions to the secure payment gateway using the secure communication channel. The secure payment gateway may provide a secure interface, operated by an issuer of the smart card, for insulating the sensitive transaction information stored on the smart card from direct interaction with the merchant system. Because the sensitive transaction information is transmitted directly to the secure payment gateway, the sensitive transaction information is not exposed to any merchant or other third party-systems.

Methods may include capturing payment information using a touch-sensitive screen embedded in a smart card. The touch-sensitive screen may display payment options that may be selected by a user of the smart card. The user may touch one or more of the displayed payment options.

The user may enter custom payment options. For example, using touch inputs, the user may instruct the microprocessor to display a virtual keypad on the touch-sensitive screen. The user may the touch displayed virtual keys to enter customized payment details. The user may also use touch inputs to navigate menus displaying payment options or other details that may be selected by the user. The user may use touch inputs to confirm or edit a payment amount.

Based on the payment options touched (e.g., selected) by the user, the microprocessor may formulate payment instructions. Capturing the payment information may include capturing touch inputs of a user applied to the touch-sensitive screen. Capturing the payment information may include the microprocessor translating finger motions applied to the touch-sensitive screen into digital payment instructions.

The smart card may include a payment interface. The payment interface may be configured to resolve selection of a merchant or a payment to a known secure merchant system. The payment interface may determine whether the merchant system is a system that meets security requirements set by the issuer of the smart card. The secure merchant system may securely process the payment instructions formulated by the smart card.

In some embodiments, before connecting to the secure merchant system, the smart card may obtain approval for communicating with the secure merchant system from an issuer bank. The smart card may use the wireless interface to request and receive approval to communicate with the secure merchant system from the issuer.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes touch-sensitive screen 105. Touch-sensitive screen 105 may be used by a user of smart card 100 to select a payment option or enter information. Exemplary information may include a PIN or a payment amount.

Smart card 100 includes a microprocessor and other components for capturing, encrypting and storing information entered by a user. Smart card 100 may also include executable instructions for packaging information entered via touch-sensitive screen 105 into transaction instructions that may be executed by a secure payment gateway. The executable instructions may also formulate the payment instructions based on sensitive transaction information stored on the smart card.

FIG. 1 shows that smart card 100 includes chip 101. Chip 101 may provide an electrical contact that is accessible through housing 102. Chip 101 may provide an electrical contact for establishing a wired or contact-based communication channel with an ATM or POS terminal when card 100 is inserted into a card reader of the ATM or POS terminal. Chip 101 may be an EMV chip.

Chip 101 may store a copy of information printed on a face of smart card 100. For example, chip 101 may store PAN 109, user name 115, expiration date 113 and issuing bank 111. Chip 101 may also store encrypted security information. The encrypted security information may be utilized to provide a "second factor" method of authentication prior to triggering execution of transaction instructions.

For example, smart card 100 may package information entered by user 115 via touch-sensitive screen 105 into payment instructions. The payment instructions may include a PIN associated with smart card 100. The payment instructions may be submitted for execution to a payment gateway without requiring any further input from user 115. The payment instructions may be transferred to the payment gateway using wireless circuitry 103.

After a payment gateway receives payment instructions formulated by smart card 100, the payment gateway may first verify that the PIN included in the payment instructions is associated with smart card 100. For example, the payment gateway may communicate with a remote payment processing server operated by the issuer and determine whether the received PIN is associated with user name 115 and/or PAN 109.

As a second factor method of authentication, the payment gateway may determine whether the PIN included in the payment instructions successfully unlocks encrypted security information stored on chip 101. If the PIN successfully unlocks the encrypted security information, the payment gateway may execute the received transaction instructions.

Smart card 100 may be any suitable size. FIG. 1 shows that smart card 100 has width w and length l. For example, width w may be 53.98 millimeters ("mm"). Length l may be 85.60 mm. Smart card 100 has thickness t. An illustrative thickness t may be 0.8 mm. An exemplary form factor of smart card 100 may be 53.98 mm×85.60 mm×0.8 mm. Such an exemplary form factor may allow smart card 100 to conveniently fit into a user's wallet or pocket. This exemplary form factor may allow smart card 100 to fit into a card reader of an ATM or POS terminal.

Figure 2A:
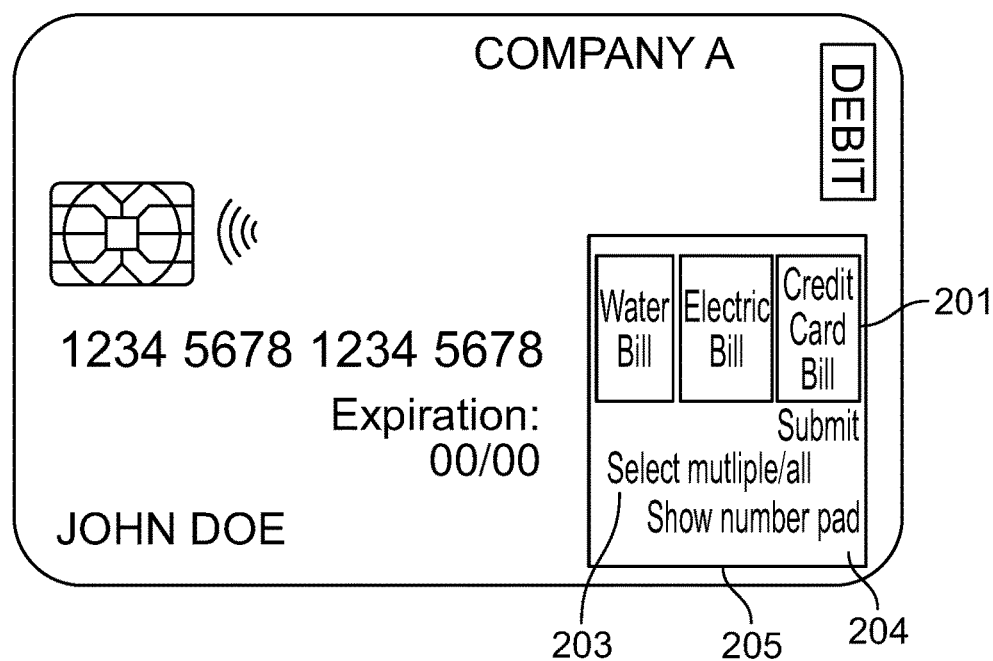
FIG. 2A shows illustrative apparatus in accordance with principles of the disclosure.

FIG. 2A shows illustrative smart card 200. Smart card 200 may include one or more features of smart card 100 (shown in FIG. 1). Smart card 200 includes touch-sensitive screen 205. Touch-sensitive screen 205 may include one or more features of touch-sensitive screen 105.

Touch-sensitive screen 205 shows illustrative selectable payment options that may be selected by a user to enter information. The selectable options may include text or any suitable graphic representation. Selectable payment option 201 is an option to pay a credit card bill. Other illustrative selectable payment options shown include an option to pay a water bill and an option to pay an electric bill. A user may touch the selectable option to initiate a payment. Touch-sensitive screen 205 also includes selectable option 203 that enables a user to select multiple payment options for contemporaneous payments. Touch-sensitive screen 205 also includes selectable option 204 that enables a user to access a virtual keypad.

Figure 2B:
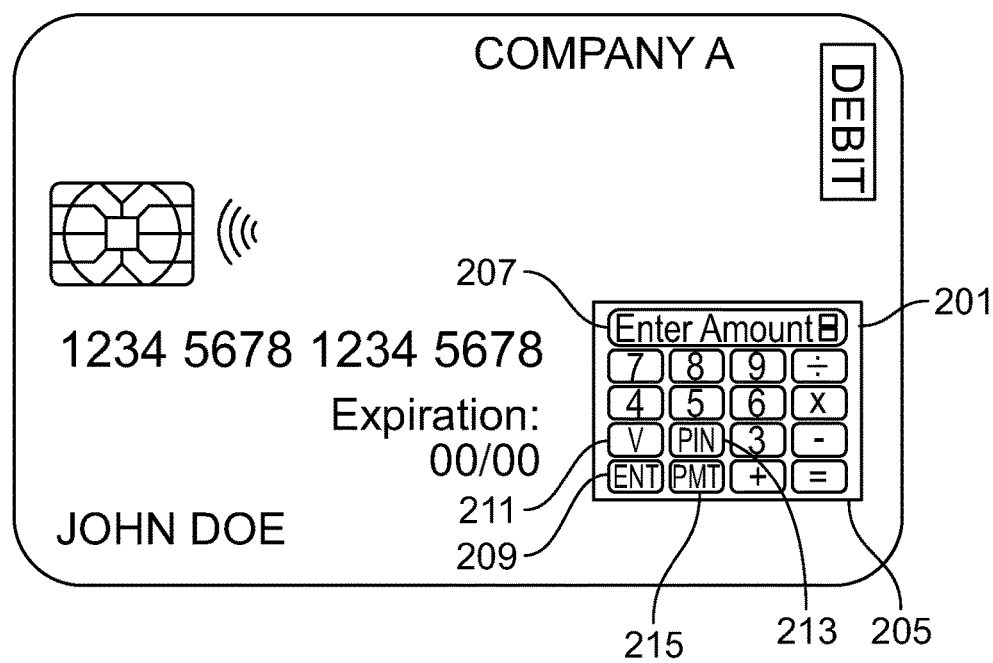
FIG. 2B shows illustrative apparatus in accordance with principles of the disclosure.

FIG. 2B shows screen 205 of smart card 200 displaying a virtual keypad. The virtual keypad includes display 207 for displaying information entered by a user. Virtual keypad display 207 may provide a user with visual prompts for entering information. For example, virtual keypad display 207 may prompt a user to enter a PIN associated with smart card 200 to authorize transmission of payment instructions to a payment gateway. FIG. 2B shows virtual keypad display 207 prompting for entry of a payment amount.

The virtual keypad displayed on touch-sensitive screen 205 shows illustrative keys that may be used to enter information. The virtual keypad includes enter key 209. A user may touch enter key 209 after entering a complete payment amount. Touching enter key 209 may trigger storage of the payment amount locally on smart card 200. Touching enter key 209 may trigger formulation of payment instructions based on the payment amount.

The virtual keypad includes payment key 215. The smart card user may touch payment key 215 to initiate a payment. Touching payment key 215 may activate a NIC of smart card 200. Once activated, the NIC may scan for an available secure communication channel.

In some embodiments, an initial touching of payment key 215 may cause virtual keypad display 207 to display a list of previously entered payments for different merchants. The user may scroll though the previously entered payments. The user may scroll through displayed entries using the "+" or "−" keys. The user may touch enter key 209 to select an entry.

Figure 2C:
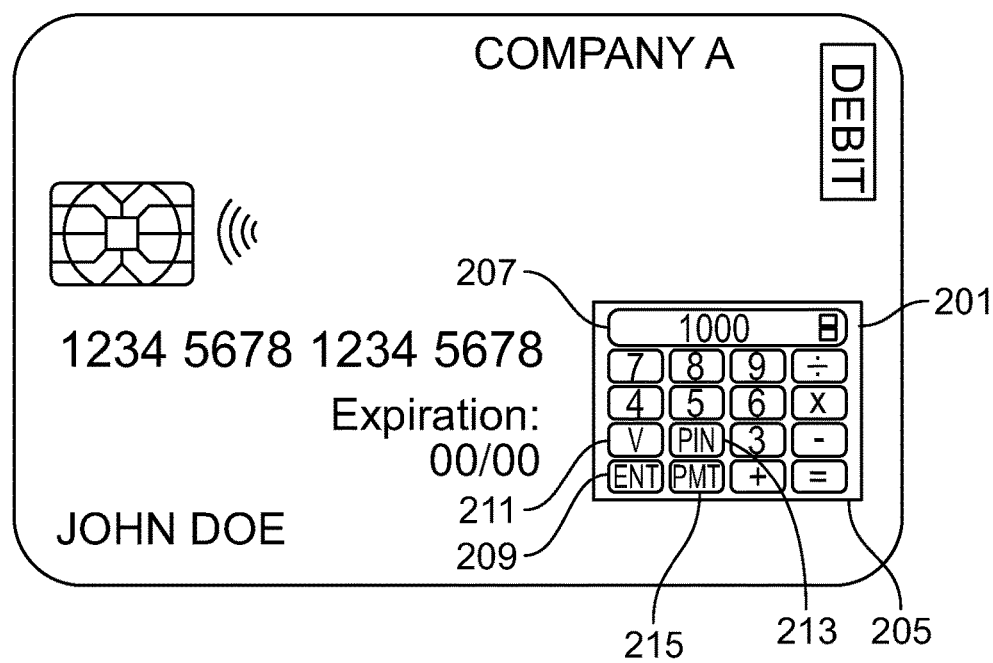
FIG. 2C shows illustrative apparatus in accordance with principles of the disclosure.

FIG. 2C shows virtual keypad display 207 of smart card 200 displaying a payment amount entered by a user. The user may confirm the entry by touching the enter button. After selecting the desired entry, the user may touch payment key 215 a second time to initiate transmission of the payment instructions formulated based on the payment amount to a payment gateway. When the payment gateway receives the transaction instructions, the payment gateway may initiate the payment defined in the payment instructions.

Before touching payment key 215 (e.g., a second time) to transmit the payment instructions, user may first touch voice confirmation key 211. Touching voice confirmation key 211 may cause smart card 211 to generate an audio message. The audio message may confirm the merchant and amount associated with the payment. If the audio message is correct, the user may proceed to press payment key 215 and transmit the payment instructions to a payment gateway.

In some embodiments, smart card 200 may be configured to automatically produce a confirmatory audio message. In such embodiments, the user may be required to confirm the content of the audio message before smart card 200 transmits the transaction instructions. For example, the user may be required to touch enter key 209 or voice confirmation key 211 to confirm the content of the audio message. Smart card 200 may prevent transmission of the payment instructions (even if the user presses payment key 215) unless the audio message has been confirmed by the user.

In response to a prompt displayed on virtual keypad display 207, a user may enter a PIN. The user may confirm submission of the PIN by touching PIN key 213. The user may be prompted to enter a PIN to confirm that that the user is authorized to initiate a transaction using smart card 200. A microprocessor may toggle wireless interface of smart card 200 from the inactive state to the active state in response to receiving a valid PIN entered using the virtual keypad.

Figure 3:
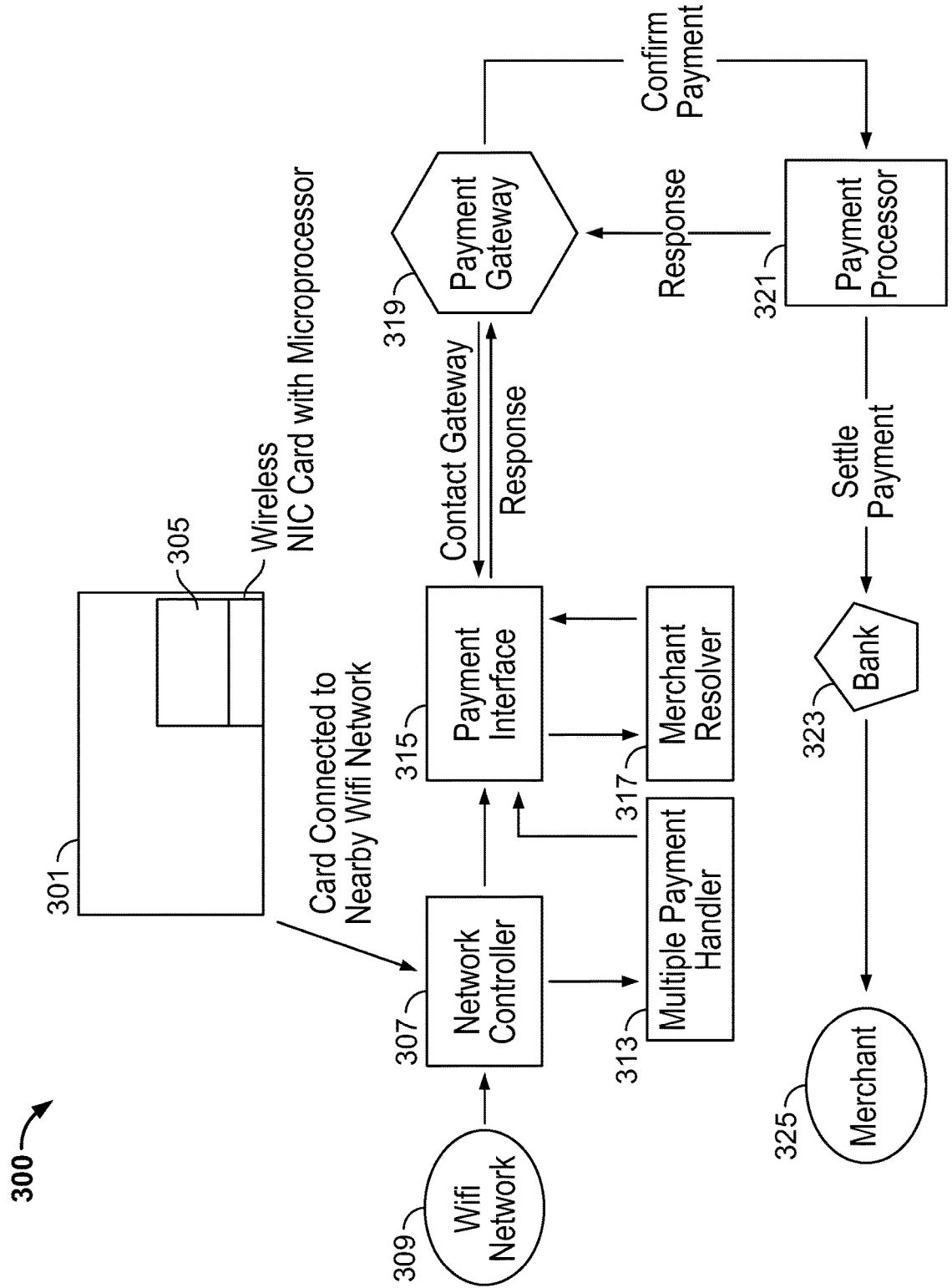
FIG. 3 shows an illustrative apparatus and process in accordance with principles of the disclosure.

FIG. 3 shows illustrative system architecture 300. System architecture 300 includes smart card 301. Smart card 301 may include one or more features of smart card 100 and/or smart card 200. Smart card 301 includes touch-sensitive screen 305, which may include one or more features of touch-sensitive screens 105 and/or 205.

FIG. 3 shows an exploded view of smart card 301 components NIC 307 and payment interface 315. NIC 307 may include its own dedicated microprocessor and memory. NIC 307 may be a microelectromechanical device that fits within the small form factor associated with smart card 301. In other embodiments, smart card 301 may include another microprocessor for performing other functions. NIC 307 may prepare data generated by a microprocessor on smart card 301 for transmission to a payment gateway or other secure computer system.

FIG. 3 shows that smart card 301 connects to Wi-Fi network 309 using NIC 307. NIC 307 is also utilized for electronic communication with multiple payment handler 313 and payment interface 315. Multiple payment handler 313 may receive an input from touch-sensitive screen 305 selecting multiple payment options and identify payment information for each of the multiple payment options. Payment interface 315 may interact with merchant resolver 317 to identify or resolve each merchant associated with a payment option captured by smart card 301. Based on a merchant identified by merchant resolver 317, smart card 301 establishes a secure communication channel with payment gateway 319. Components 305, 307, 313, 315 and 317 are all resident on smart card 301.

A network address associated with payment gateway 319 may be identified based on a merchant identified by merchant resolver 317 and payment interface 315. A network address associated with payment gateway 319 may be identified based on a payment amount captured by smart card 301. Payments of different tier payment amounts may be routed to different payment gateways. In other embodiments, the network address of a payment gateway may be hardwired into NIC 307.

Payment gateway 319 may determine whether smart card 301 is associated with sufficient funds to process received payment instructions. Payment gateway 319 may perform one or more checks to verify payment instructions received from smart card 301. For example, payment gateway 319 may prompt a user of smart card 301 to enter a PIN into a virtual keypad displayed on touch-screen 305.

After authenticating payment instructions received from smart card 301, payment gateway 319 submits the payment instructions to payment processor 321 for settlement. Payment processor 321 may ensure that funds corresponding to the payment are debited from an account associated with smart card 301. Payment processor 321 may ensure that funds corresponding to the payment are credited to an account associated with merchant 325. Bank 323 may facilitate settlement of funds among merchant 325 and accounts associated with smart card 301. Bank 323 may be an issuer of smart card 301. Bank 323 may be an acquirer associated with merchant 325.

Figure 4:
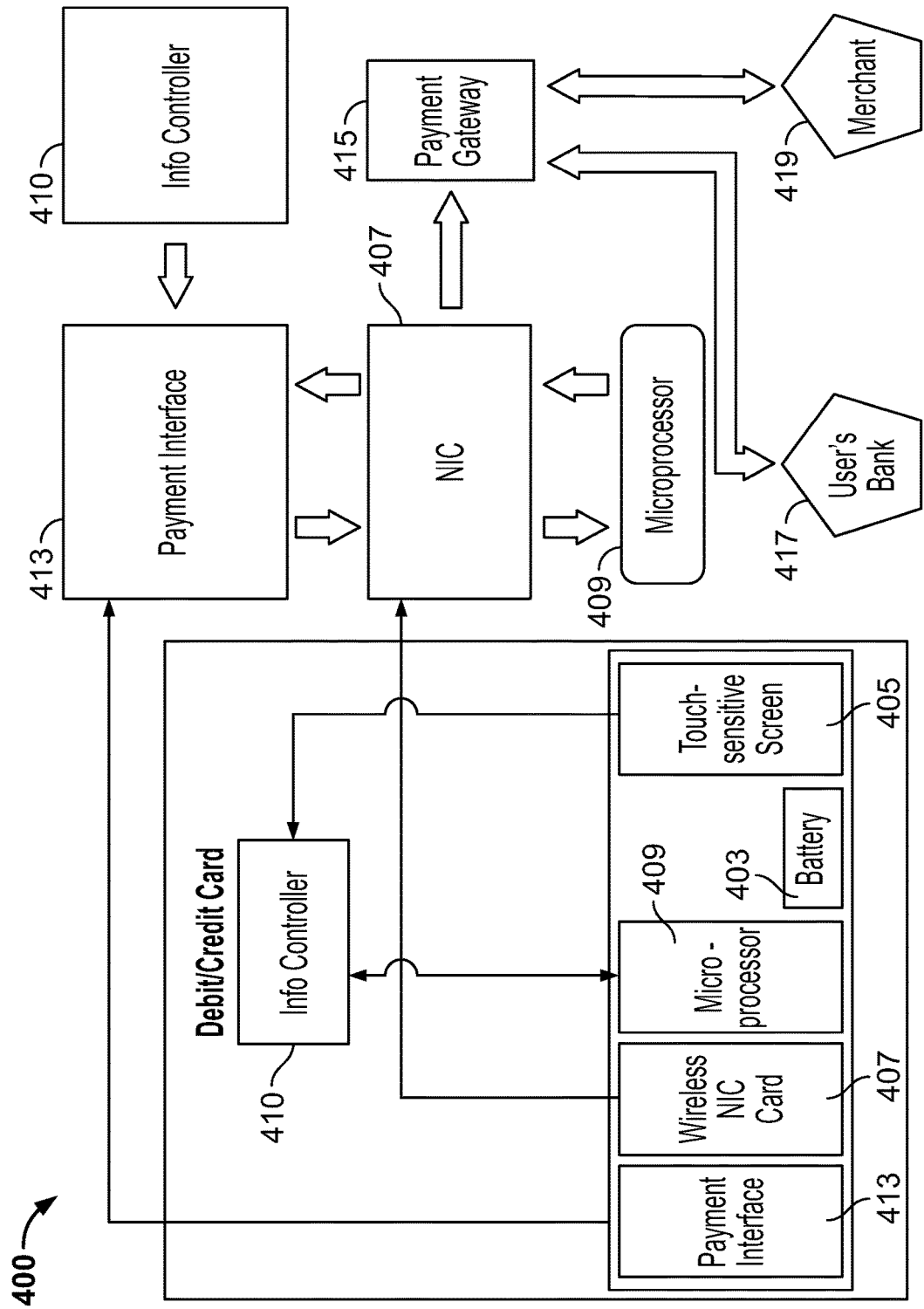
FIG. 4 shows an illustrative apparatus and process in accordance with principles of the disclosure.

FIG. 4 shows illustrative system components of smart card 400. Smart card 400 may include one or more features of smart cards 100, 200, and/or 301. Smart card 400 includes information controller 410. Information controller 410 may capture data entered using touch-sensitive screen 405. Information controller 410 may encrypt data captured by touch-sensitive screen 405. Illustrative encryption algorithms include RSA cryptography, Blowfish, AES, RC4, RC5, and RC6. Input controller 410 may store captured data locally on smart card 400.

Smart card 400 includes microprocessor 409 which controls overall operation of smart card 400 and its associated components. For example, microprocessor may control operation of NIC 407 and communication with payment gateway 415.

Microprocessor 409 may formulate transaction instructions destined for merchant system 419. Such transaction instructions may be forwarded to merchant system 419 by payment gateway 415. In some embodiments, smart card 400 may be configured to directly communicate with merchant system 419. For example, after a successful execution of payment instructions by payment gateway 415, smart card 400 may receive confirmation from merchant system 419.

Microprocessor 409 may formulate transaction instructions destined for user's bank 417. Such transaction instructions may be forwarded to user's bank 417 by payment gateway 415. In some embodiments, smart card 400 may be configured to directly communicate with user's bank 417. For example, user's bank 417 may request authentication, such as a PIN, before debiting an account associated with smart card 400 based on received payment instructions.

Thus, methods and apparatus for CONTEMPORANEOUS PAYMENT TECHNOLOGY are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart card that enables direct online payments and improves security of sensitive transaction information, the smart card comprising:
    a housing;
    a wireless communication interface embedded in the housing;
    a microprocessor embedded in the housing;
    a battery for powering the communication interface and the microprocessor;
    a touch-sensitive screen that captures finger motions; and
    executable instructions stored in a non-transitory memory, that when run by the microprocessor:
        display a first selectable payment option associated with a payment due a first merchant and a second selectable payment option associated with a payment due a second merchant using the touch-sensitive screen;
        capture a touch-based selection of the first payment option and the second payment option using the touch-sensitive screen;
        based on the captured selection, formulate a first set of payment instructions for the first payment option and a second set of payment instructions for the second payment option;
        using the wireless interface, establish a first direct communication channel with a first secure payment gateway identified in the first payment instructions and a second direct communication channel with a second secure payment gateway identified in the second payment instructions;
        using a payment interface, resolve the first payment instructions to a first network address associated with a first secure payment gateway and the second payment instructions to a second network address associated with a second secure payment gateway; and
        transmit the first payment instructions directly to the first secure payment gateway and the second payment instructions directly to the second secure payment gateway for processing.

2. The smart card of claim 1, wherein the card further comprises a payment interface configured to determine a network address of a secure payment gateway, the network address based at least in part on a captured selection.

3. The smart card of claim 1, wherein, in response to selection of a payment option, the executable instructions when run by the microprocessor:
    display a payment amount using the touch-sensitive screen;
    display a selectable option to confirm the payment amount using the touch-sensitive screen; and
    display a selectable option to edit the payment amount using the touch-sensitive screen.

4. The smart card of claim 3, wherein the executable instructions when run by the microprocessor:
    capture a touch-based selection of the option to edit the payment;
    display a virtual keypad using the touch sensitive screen;
    capture an edited payment amount via a touch-based input using the virtual keypad; and
    formulate the payment instructions based, at least in part, on the edited payment amount.

5. The smart card of claim 1, wherein the executable instructions stored in the non-transitory memory, when run by the microprocessor receive confirmation from a secure payment gateway via the wireless interface that the payment instructions formulated by the smart card have been successfully executed.

6. The smart card of claim 1, wherein the smart card further comprises a biometric reader and the computer-executable instructions, when run by the microprocessor require capturing, using the biometric reader, a valid biometric feature before transmitting payment instructions to a secure payment gateway.

7. The smart card of claim 1, wherein the housing and the touch-sensitive screen collectively have a thickness that is not greater than 0.8 millimeters ("mm").

8. The smart card of claim 1, wherein:
    the wireless interface comprises:
        an inactive state in which the wireless interface is unable to transmit data; and
        an active state in which the wireless interface is capable of transmitting data; and
    the microprocessor toggles the wireless interface from the inactive state to the active state in response to receiving a valid personal identification number ("PIN") entered using a virtual keypad displayed on the touch-sensitive screen.

9. A method of enabling direct online payments while securing sensitive transaction information stored on a smart card, the method comprising:
    using a touch-sensitive screen of the smart card, capturing a selection of a first payment option for a payment due a first merchant and a selection of a second payment option for a payment due a second merchant;
    generating first payment instructions that integrate the sensitive transaction information stored on the smart card and payment information associated with the captured selection of the first payment option;
    generating second payment instructions that integrate the sensitive transaction information stored on the smart card and payment information associated with the captured selection of the second payment option;
    using a payment interface of the smart card, resolving the first payment instructions to a first network address associated with a first payment gateway and the second payment instructions to a second network address associated with a second secure payment gateway;
    using a wireless interface of the smart card, establishing a first secure communication channel with the first secure payment gateway and a second secure communication channel with the second secure payment gateway; and
    transmitting the first payment instructions to the first secure payment gateway using the first secure communication channel and the second payment instructions to the second secure payment gateway using the second secure communication channel, wherein each secure payment gateway provides a secure interface for insulating the sensitive transaction information stored on the smart card.

10. The method of claim 9, further comprising determining a network address for a secure payment gateway based, at least in part, on the identity of a merchant associated with the payment.

11. The method of claim 9, further comprising:
using the touch-sensitive screen, providing visual confirmation of the captured selection of a payment option; and
displaying, using the touch-sensitive screen, additional selectable payment options.

12. A system for enabling direct online payments while securing transmission of sensitive transaction information, the system comprising a smart card having a thickness not greater than 0.8 millimeters ("mm") and a surface area not greater than 86 mm×54 mm and comprising:
a wireless communication interface;
a microprocessor;
a user input system in electronic communication with the microprocessor, the user input system comprising:
a touch-sensitive screen; and
an input controller that captures data entered using the touch-sensitive screen; and
executable instructions stored in a non-transitory memory, that when run by the microprocessor:
formulate first encrypted payment instructions based on selection of a first payment option captured by the touch-sensitive screen and second payment instructions based on selection of a second payment option captured by the touch sensitive screen;
establish a first secure communication link with a first payment gateway and a second secure communication link with a second payment gateway using the wireless interface;
resolve the first encrypted payment instructions to a first network address associated with the first payment gateway and the second encrypted payment instructions to a second network address associated with the second payment gateway;
authenticate the smart card over a first secure communication channel to the first payment gateway and over a second secure communication channel to the second payment gateway; and
transmit the first encrypted payment instructions to the first payment gateway and the second encrypted payment instructions to the second payment gateway.

13. The system of claim 12, the smart card further comprising a voice controller, the voice controller configured to:
generate an audio message confirming the data captured by the input controller; an
generate an audio message confirming the encrypted payment instructions generated by the microprocessor;
wherein the microprocessor does not transmit the encrypted payment instructions to the payment gateway until receiving an authorization input entered using the touch-sensitive screen.

14. The system of claim 13, wherein the audio message specifies the authorization input.

15. The system of claim 12, wherein the smart card further comprises a payment interface and the executable instructions when run by the microprocessor determine a network address of a payment gateway based on selection of a payment option.

\* \* \* \* \*